United States Patent
Pal

(10) Patent No.: US 11,165,309 B2
(45) Date of Patent: Nov. 2, 2021

(54) MOTOR COOLING SYSTEM AND METHOD

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 144 days.

(21) Appl. No.: 16/409,066

(22) Filed: May 10, 2019

(65) Prior Publication Data

US 2020/0358338 A1   Nov. 12, 2020

(51) Int. Cl.

| | |
|---|---|
| H02K 9/19 | (2006.01) |
| F01D 9/04 | (2006.01) |
| H02K 7/18 | (2006.01) |
| B64D 33/08 | (2006.01) |
| F01D 15/02 | (2006.01) |
| F01D 25/12 | (2006.01) |

(52) U.S. Cl.
CPC .............. *H02K 9/19* (2013.01); *B64D 33/08* (2013.01); *F01D 9/041* (2013.01); *F01D 15/02* (2013.01); *F01D 25/12* (2013.01); *H02K 7/1823* (2013.01); *F05D 2220/76* (2013.01); *F05D 2260/232* (2013.01)

(58) Field of Classification Search
CPC ........ H02K 9/19; H02K 7/1823; B64D 33/08; F01D 9/041; F01D 15/02; F01D 25/12; F01D 9/065; F05D 2220/76; F05D 2260/232; F05D 2260/98; F02C 7/14; F02K 3/115
USPC ....................................................... 415/116
See application file for complete search history.

(56) References Cited

U.S. PATENT DOCUMENTS

| | | | |
|---|---|---|---|
| 4,218,178 A * | 8/1980 | Irwin ...................... | F01D 5/185 |
| | | | 415/114 |
| 7,377,098 B2 | 5/2008 | Walker et al. | |
| 10,676,205 B2 * | 6/2020 | Niergarth .............. | F04D 29/325 |
| 10,784,750 B2 * | 9/2020 | Gerstler .................... | F01D 9/02 |
| 2011/0268562 A1 | 11/2011 | Knight, III et al. | |
| 2013/0049364 A1 * | 2/2013 | Teets .................... | G08G 1/0129 |
| | | | 290/45 |
| 2017/0159489 A1 | 6/2017 | Sennoun | |

(Continued)

FOREIGN PATENT DOCUMENTS

| | | |
|---|---|---|
| FR | 3028575 A1 | 5/2016 |
| GB | 1244340 A | 8/1971 |

OTHER PUBLICATIONS

Extended European search report issued in corresponding EP application No. 19213221.5, dated Jun. 29, 2020.

*Primary Examiner* — J. Todd Newton
(74) *Attorney, Agent, or Firm* — Locke Lord LLP; Scott D. Wofsy; Georgi Korobanov

(57) ABSTRACT

A motor cooling system including, an engine nacelle defining a primary axis, a stator housing within the engine nacelle, a plurality of stator guide vanes attached to the stator circumferentially disposed around the primary axis, where at least one stator guide vane of the plurality of stator guide vanes includes at least one conduit configured to receive a fluid from a first engine component in the engine nacelle and wherein at least one stator guide vane of the plurality of stator guide vanes includes at least one conduit configured to pass the fluid to a second engine component in the engine nacelle.

18 Claims, 2 Drawing Sheets

(56) References Cited

U.S. PATENT DOCUMENTS

| | | | |
|---|---|---|---|
| 2017/0204879 A1 | 7/2017 | Zaccardi et al. | |
| 2018/0050806 A1* | 2/2018 | Kupiszewski | B64D 27/24 |
| 2018/0050807 A1* | 2/2018 | Kupiszewski | B60L 50/12 |
| 2018/0050810 A1* | 2/2018 | Niergarth | F02C 6/206 |
| 2018/0050811 A1 | 2/2018 | Niergarth et al. | |
| 2018/0051716 A1* | 2/2018 | Cheung | B64D 33/10 |
| 2018/0087392 A1 | 3/2018 | Chalaud et al. | |
| 2018/0339780 A1* | 11/2018 | Barone | B64D 27/24 |
| 2020/0067383 A1* | 2/2020 | Hon | H02K 21/145 |
| 2020/0172259 A1* | 6/2020 | Hinderliter | B64D 27/24 |
| 2020/0358338 A1* | 11/2020 | Pal | F02K 3/115 |

\* cited by examiner

MOTOR COOLING SYSTEM AND METHOD

BACKGROUND

Technological Field

The present disclosure relates to a motor cooling system, and more particularly to an electric motor cooling system.

Description of Related Art

A variety of devices are known in the aircraft heat exchanger and cooling system field. For aircraft with electric fan motors are used for operating fans for propulsion, over heating of the fan motor is a major issue. Conventional methods and systems have generally been considered satisfactory for their intended purpose. However, there is still a need in the art for cooling systems having reduced weight and profile while improving performance. There also remains a need in the art for such systems and components that are economically viable. The present disclosure may provide a solution for at least one of these remaining challenges.

SUMMARY OF THE INVENTION

A motor cooling system includes an engine nacelle defining a primary axis, a stator housing within the engine nacelle, a plurality of stator guide vanes attached to the stator circumferentially disposed around the primary axis, herein at least one stator guide vane of the plurality of stator guide vanes includes at least one conduit configured to receive a fluid from a first engine component in the engine nacelle and wherein at least one stator guide vane of the plurality of stator guide vanes includes at least one conduit configured to pass the fluid to a second engine component in the engine nacelle. The first component can be an oil pump and the second component can an electric propulsion fan motor. The electric propulsion fan motor can include a permanent magnet and be connected electrically to a motor controller.

At least one stator guide vane of the plurality of stator guide vanes can include a pair of fluidly connected conduits, wherein the first conduit is a supply conduit and the second conduit is a return conduit. At least a first conduit within a first stator guide vane of the plurality of stator guide vanes can be fluidly connected to a second conduit within a second stator guide vane of the plurality of stator guide vanes, wherein the first conduit and the second conduit are connected through a third conduit within the engine nacelle or a fourth conduit within the stator housing. Each of the stator guide vanes of the plurality of stator guide vanes can include at least one conduit therein and each of the conduits are fluidly connected to each other. The at least one conduit can be directed orthogonal to the primary axis. The plurality of stator guide vanes can a plurality of bypass air flow channels configured for passing bypass flow from the propeller.

A method of cooling an electrical motor includes driving a fluid, such as oil, at a first temperature to at least one conduit within a stator guide vane located in a bypass flow path of an aircraft nacelle, flowing bypass air from an propulsion fan over the stator guide vane in order to cool the fluid within the at least on conduit, and driving return fluid from the at least one conduit at a second temperature by a pump to an electric motor in order to cool the electric motor. The stator guide vane supports a fan casing of the aircraft nacelle. The return fluid can pass over a motor controller in order to cool the motor controller.

The method can include driving fluid from the at least one conduit within the stator guide vane to a second conduit within the stator guide vane, and driving fluid from the at least one conduit within the stator guide to a second conduit within a second stator guide vane.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
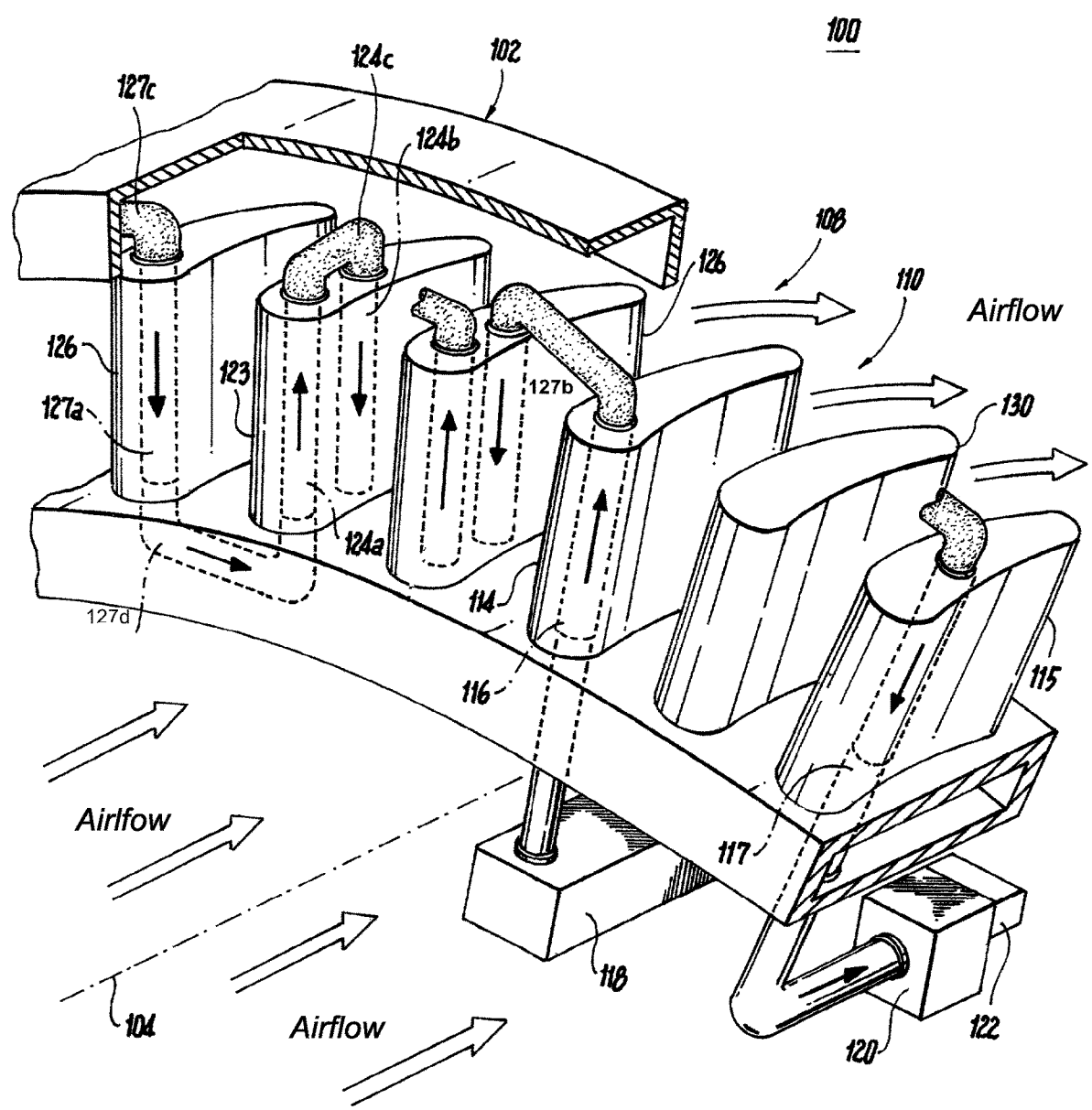
FIG. 1 is a perspective view of a motor cooling system.

Reference will now be made to the drawings wherein like reference numerals identify similar structural features or aspects of the subject invention. For purposes of explanation and illustration, and not limitation, a partial view of an exemplary embodiment of a motor cooling system in accordance with the invention is shown in FIG. 1 and is designated generally by reference character 100. Other aspects of the invention are provided in FIG. 2, as will be described. The methods and systems of the invention can be used to reduce weight and drag of an aircraft nacelle, while also providing superior cooling properties.

As shown in FIG. 1, a motor cooling system 100 includes an aircraft engine nacelle 102 defining a primary axis 104, a stator housing 106 within the engine nacelle 102, a plurality of stator guide vanes 108 attached to the stator housing 106 circumferentially disposed around the primary axis 104. The plurality of stator guide vanes 108 define a plurality of bypass air flow channels 110 configured for passing bypass flow from a propeller of the aircraft, the guide vanes 108 also provide structure and support to the nacelle 102. At least one stator guide vane 114 of the plurality of stator guide vanes 108 includes at least one conduit 116 configured to receive a fluid, such as oil, from a first engine component 118 located within the engine nacelle 102, such as an oil pump 118. Also, at least one stator guide vane 115 of the plurality of stator guide vanes includes at least one conduit 117 configured to pass fluid to a second engine component 120 located within the engine nacelle 102. The second component 120 can be electric propulsion fan motor, which requires cooling. The electric propulsion fan motor 120 can be driven using include a permanent magnet motor and be electrically connected to a motor controller 122. The system 100 can also be used to cool the motor controller 122.

At least one stator guide vane 123 of the plurality of stator guide vanes 118 can include a pair of fluidly connected conduits 124a/b, wherein the first conduit 124a is a supply conduit and the second conduit 124b is a return conduit. The first conduit 124a and the second conduit 124b are interconnected by an interconnecting conduit 124c within the stator guide vane 123 and create a flow path for the fluid. It is also conceived that at least a first conduit 127a within a first stator guide 126 vane of the plurality of stator guide vanes 108 can be fluidly connected to a second conduit 127b within a second stator guide vane 123 of the plurality of stator guide vanes 108, wherein the first conduit 127a and the second conduit 127b are connected through a third conduit 127c within the casing 103 of the engine nacelle 102 or a fourth conduit 127d within the stator housing 106. Not all stator guide vanes of the plurality of the stator guide vanes 108 include conduit there though. Some of the stator guide vanes can be solid 130 in order to provide even more support in critical areas. It is also conceived that each of the stator guide vanes of the plurality of stator guide vanes 108 include at least one conduit therein wherein each of the conduits are fluidly connected to each other. Each of the conduits can be directed orthogonal to the primary axis 104.

Figure 2:
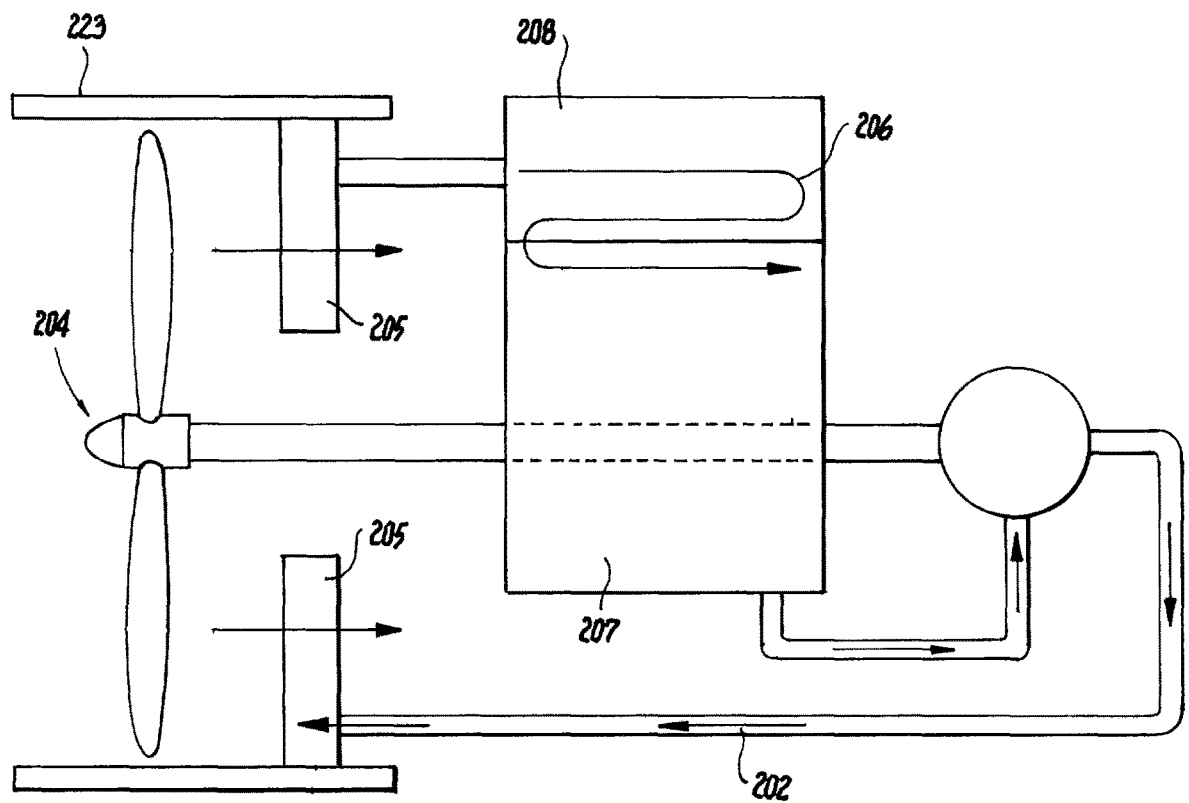
FIG. 2 is diagram view of FIG. 1, showing the flowpath of the cooling fluid.

As diagramed in FIG. 2, a method 200 of cooling an electrical motor is also disclosed. The method includes driving a fluid 202, such as oil, at a first temperature to at least one conduit 222 within a stator guide vane 205 located in a bypass flow path 203 of an aircraft nacelle 223, flowing bypass air 203 from an propulsion fan 204 over the stator guide vane 205 in order to cool the fluid 202 within the at least on conduit 222, and driving return fluid 206 from the at least one conduit at a second, lower, temperature by a pump to an electric motor 207 in order to cool the electric motor 207. The stator guide vane 205 can provide support to the fan casing of the aircraft nacelle and straighten downstream airflow. The return fluid 206 can also flow through a cold plate 208. This cold plate 208 is a part of the motor controller. Motor controller electronic components are mounted thermally and structurally on this cold plate 208. The cold plate 208 is cooled by oil flow from the stator vanes and then routed to the motor 207.

The method can include driving 203a fluid from the at least one conduit within the stator guide vane to a second conduit within the stator guide vane, and driving 203b fluid from the at least one conduit within the stator guide to a second conduit within a second stator guide vane. This method results in improved thermal performance and higher reliability of motors and motor controllers.

The methods and systems of the present disclosure, as described above and shown in the drawings provide for a motor cooling system with superior properties including reduced size, weight, and cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A motor cooling system comprising:
    an engine nacelle;
    a stator housing within the engine nacelle; and
    a plurality of stator guide vanes attached to the stator and the engine nacelle, wherein at least one stator guide vane of the plurality of stator guide vanes includes at least one first conduit to port a fluid from the stator housing to the nacelle and at least another stator guide vane of the plurality of stator guide vanes includes at least one second conduit configured to port the fluid from the stator guide vane to a second engine component, and a third plurality of stator guide vanes including a plurality of counterflowing conduits configured to port the fluid to an adjacent stator guide vane.

2. The motor cooling system of claim 1, wherein the first engine component is an oil pump.

3. The motor cooling system of claim 1, wherein the second engine component is an electric propulsion fan motor.

4. The motor cooling system of claim 1, wherein at least a first conduit within a first stator guide vane of the plurality of stator guide vanes is fluidly connected to a second conduit within a second stator guide vane of the plurality of stator guide vanes.

5. The motor cooling system of claim 4, wherein the first conduit and the second conduit are connected through a third conduit within a casing of the engine nacelle.

6. The motor cooling system of claim 4, wherein the first conduit and the second conduit are connected through a fourth conduit within the stator housing.

7. The motor cooling system of claim 1, wherein each of the stator guide vanes of the plurality of stator guide vanes includes at least one conduit therein and each of the conduits are fluidly connected to each other.

8. The motor cooling system of claim 1, wherein the at least one conduit is directed orthogonal to a primary axis of the stator housing.

9. The motor cooling system of claim 3, wherein the electric propulsion fan motor including a permanent magnet motor is electrically connected to a motor controller.

10. The motor cooling system of claim 1, wherein the plurality of stator guide vanes define a plurality of bypass air flow channels configured for passing bypass flow from a propeller.

11. A method of cooling a motor comprising:
    driving a fluid through at a first conduit within a stator guide vane from a first aircraft component;
    driving the fluid through at a second conduit within a-a second stator guide vane to a second aircraft component; and
    driving the fluid from the stator guide vane to the second stator guide vane through a third conduit and driving the fluid from the stator guide vane to a stator guide vane through a fourth conduit.

12. The method of claim 11, further comprising flowing air from a propulsion fan over the stator guide vane.

13. The method of claim 11, wherein the stator guide vane supports a fan casing of an aircraft nacelle.

14. The method of claim 11, wherein the return fluid passes over a motor controller in order to cool the motor controller.

15. The method of claim 11, further comprising driving fluid from the at least one conduit within the stator guide vane to a second conduit within the stator guide vane.

16. The method of claim 11, further comprising driving fluid from the at least one conduit within the stator guide to a second conduit within a second stator guide vane.

17. The motor cooling system of claim 1, wherein each of the stator guide vanes include a pair of counterflowing conduits.

18. The motor cooling system of claim 17, wherein each of the counterflowing conduits connect adjacent stator guide vanes.

* * * * *